US008511065B2

(12) United States Patent
Greszler et al.

(10) Patent No.: US 8,511,065 B2
(45) Date of Patent: Aug. 20, 2013

(54) ENGINE WITH EMISSIONS CONTROL ARRANGEMENT AND METHOD OF CONTROLLING ENGINE EMISSIONS

(75) Inventors: Anthony Greszler, Hagerstown, MD (US); Andreas Hinz, Onsala (SE)

(73) Assignee: Mack Trucks, Inc., Greensboro, NC (US)

( * ) Notice: Subject to any disclaimer, the term of this patent is extended or adjusted under 35 U.S.C. 154(b) by 831 days.

(21) Appl. No.: 12/293,840

(22) PCT Filed: Apr. 13, 2006

(86) PCT No.: PCT/US2006/014053
§ 371 (c)(1),
(2), (4) Date: Sep. 22, 2008

(87) PCT Pub. No.: WO2007/120126
PCT Pub. Date: Oct. 25, 2007

(65) Prior Publication Data
US 2009/0126345 A1 May 21, 2009

(51) Int. Cl.
F02M 25/07 (2006.01)
(52) U.S. Cl.
USPC .................. 60/278; 60/274; 60/280; 60/286
(58) Field of Classification Search
USPC .................................. 60/274, 278, 280, 286
See application file for complete search history.

(56) References Cited

U.S. PATENT DOCUMENTS

| 5,628,186 A | 5/1997 | Schmelz |
| 5,845,487 A | 12/1998 | Fraenkle et al. |
| 5,884,476 A | 3/1999 | Hirota et al. |
| 5,983,628 A * | 11/1999 | Borroni-Bird et al. ......... 60/274 |
| 6,209,317 B1 | 4/2001 | Hirota |
| 6,467,257 B1 * | 10/2002 | Khair et al. ...................... 60/278 |
| 6,820,415 B2 * | 11/2004 | Abet et al. ........................ 60/286 |
| 6,834,496 B2 * | 12/2004 | Nakatani et al. ................ 60/274 |
| 6,871,490 B2 | 3/2005 | Liang et al. |
| 6,928,806 B2 | 8/2005 | Tennison et al. |
| 7,185,488 B2 * | 3/2007 | Otsubo et al. ................... 60/295 |
| 7,207,176 B2 * | 4/2007 | Mulloy et al. .................. 60/602 |
| 2004/0098972 A1 | 5/2004 | Upadhyay et al. |

(Continued)

FOREIGN PATENT DOCUMENTS

EP 1564385 A2 8/2005
GB 2352651 A 2/2001

(Continued)

OTHER PUBLICATIONS

Supplementary European Search Report for corresponding European Application EP 6750163.

(Continued)

*Primary Examiner* — Thomas Denion
*Assistant Examiner* — Brandon Lee
(74) *Attorney, Agent, or Firm* — WRB-IP LLP

(57) ABSTRACT

An engine with an emissions control arrangement includes an engine including an intake and an exhaust system, an EGR system comprising a conduit between the exhaust system and the intake and an EGR controller between the exhaust system and the conduit, the EGR controller being adapted to control EGR flow from the exhaust system to the intake, a reduction agent introduction system adapted to introduce a reduction agent into the exhaust system, and a controller arranged to adjust EGR flow and reduction agent introduction as functions of each other.

24 Claims, 1 Drawing Sheet

(56) References Cited

U.S. PATENT DOCUMENTS

| | | | |
|---|---|---|---|
| 2005/0229900 A1 | 10/2005 | Weber et al. | |
| 2006/0053773 A1* | 3/2006 | Mayer et al. | 60/286 |
| 2006/0086080 A1* | 4/2006 | Katogi et al. | 60/278 |
| 2006/0112679 A1* | 6/2006 | Kojima et al. | 60/278 |
| 2006/0130465 A1* | 6/2006 | Sun et al. | 60/295 |
| 2006/0225407 A1* | 10/2006 | Tahara et al. | 60/286 |
| 2006/0266336 A1* | 11/2006 | Nazarov et al. | 123/501 |

FOREIGN PATENT DOCUMENTS

| | | |
|---|---|---|
| JP | 2001193527 A | 7/2001 |
| JP | 2004293398 | 10/2004 |
| JP | 2005344678 A | 12/2005 |

OTHER PUBLICATIONS

International Search Report for corresponding International Application PCT/US2006/014053.

International Preliminary Report on Patentability for corresponding International Application PCT/US2006/014053.

Japanese Official Action (translation) from corresponding Japanese App. 2009-505344.

Patent Abstracts of Japan and machine translation for JP204293398, Oct. 21, 2004, Mitsubishi Motors Corp.

Translation of Official Action of corresponding Japan application No. 2009-505344.

* cited by examiner

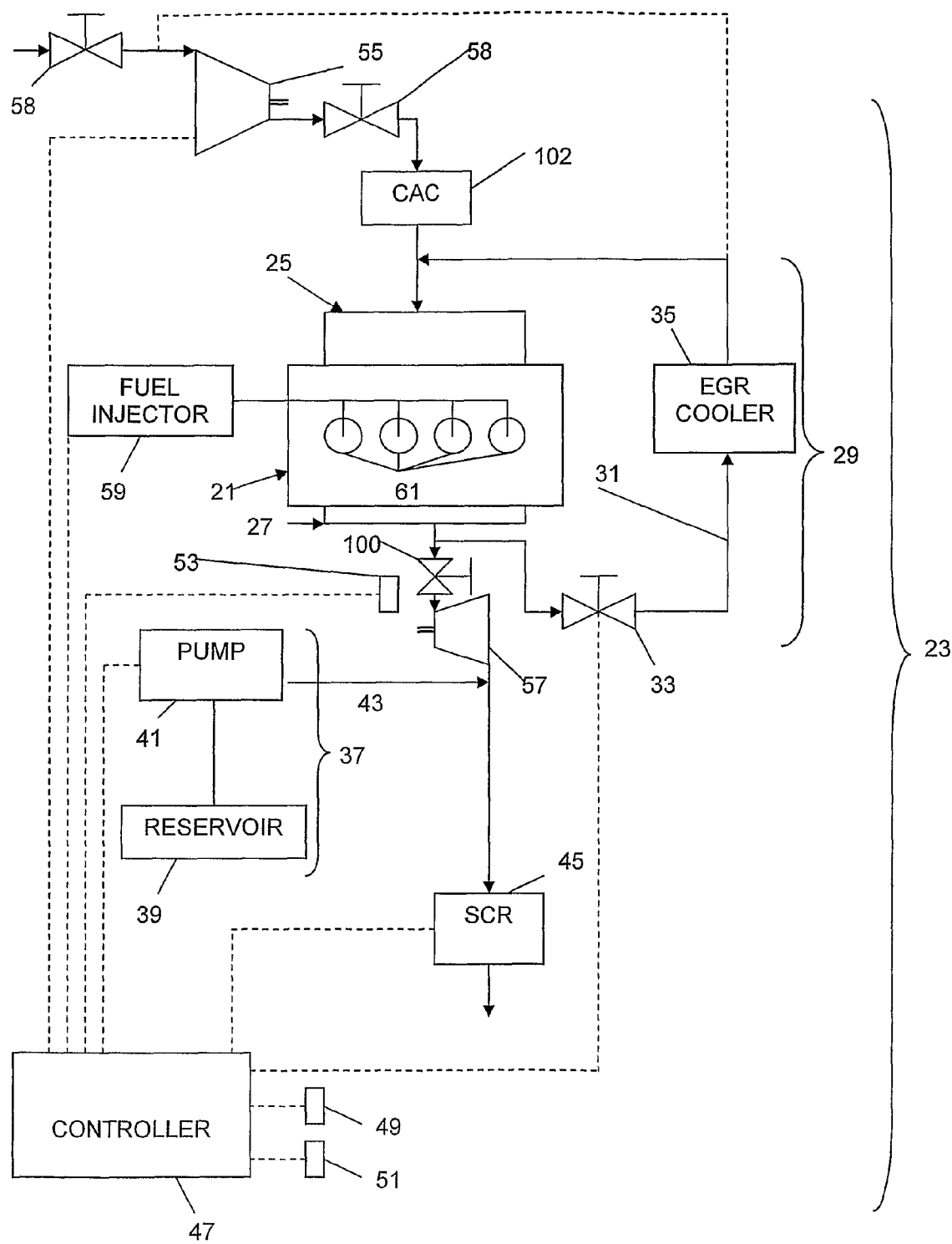

ENGINE WITH EMISSIONS CONTROL ARRANGEMENT AND METHOD OF CONTROLLING ENGINE EMISSIONS

BACKGROUND AND SUMMARY

During combustion in compression ignition internal combustion engines, above temperatures of approximately 2500° F. (1372° C.), nitrogen in air reacts with oxygen to produce oxides of nitrogen (NOx). Regulations and the like such as the so-called US07, US10, and Euro 5 regulations on emissions levels for heavy-duty, on-highway vehicles would substantially limit the amount of NOx that an engine can produce.

Exhaust gas recirculation (EGR) systems, which introduce a portion of the exhaust gases into the engine intake, dilute the oxygen in the incoming air charge and can lower combustion temperatures. Accordingly, EGR systems can be useful in reducing engine NOx emissions. The amount of EGR flow can be controlled by an EGR controller such as an EGR valve, a turbocharger, such as a variable geometry turbocharger (VGT), an exhaust backpressure device, an intake throttle, and the like, and, typically, by some combination of two or more of these controllers.

One problem with EGR systems is that they tend to drive up heat rejection. In order to introduce the EGR flow to the engine intake, it ordinarily must be cooled in an EGR cooler. The need for an EGR cooler typically means that the power unit, such as the engine of a vehicle, will require more radiator surface area, i.e., bigger radiators, and/or larger cooling fan. This, in turn, typically imposes limitations on vehicle designs, such as necessitating large front faces having poor aerodynamic characteristics.

Another problem with EGR systems is that they tend to increase fuel consumption. In addition to fuel consumption increases due to limits on vehicle aerodynamics and cooling fan power consumption, it is necessary to create sufficient exhaust back pressure to force the exhaust gas through the cooler and into the intake system. The mixture of exhaust gas and fresh air must also be pumped into the combustion chamber. These "pumping" losses can be substantial.

Yet another problem with EGR systems is that they tend to lower power density, i.e., power output is lower relative to displacement.

Other techniques for limiting NOx emissions include use of exhaust aftertreatment (EAT) systems, such as reduction agent introduction systems for introducing reduction agents such as urea or ammonia, as well as hydrocarbons or hydrogen into the exhaust stream, together with selective catalytic reduction (SCR) catalysts (urea, hydrocarbon (HC), ammonia, hydrogen, alcohols, etc.) or other technology such as lean NOx adsorbers (LNA). As explained in U.S. Pat. No. 6,871, 490, which is incorporated by reference, as the exhaust stream and reduction agent passes through the SCR catalyst, the reduction agent reacts with the NOx to reduce the NOx to molecular nitrogen and water, thereby reducing the NOx emissions from the engine.

It is desirable to maintain NOx emissions at or below predetermined levels, such as those set in the various regulations. It is also desirable to minimize EGR use and thereby reduce heat rejection, improve fuel consumption, and increase power density.

In accordance with an aspect of the present invention, an engine with an emissions control arrangement comprises an engine comprising an intake and an exhaust system, an EGR system comprising a conduit between the exhaust system and the intake and an EGR controller between the exhaust system and the conduit, the EGR controller being adapted to control EGR flow from the exhaust system to the intake, a reduction agent introduction system adapted to introduce a reduction agent into the exhaust system, and a controller arranged to adjust EGR flow and reduction agent introduction as functions of each other.

In accordance with another aspect of the present invention, a method of controlling engine emissions comprises adjusting EGR flow from an exhaust system to an intake of the engine and adjusting introduction of a reduction agent into the exhaust system, the EGR flow and reduction agent introduction being adjusted as functions of each other.

BRIEF DESCRIPTION OF THE DRAWINGS

The features and advantages of the present invention are well understood by reading the following detailed description in conjunction with the drawings in which like numerals indicate similar elements and in which:

FIG. 1 is a schematic view of an engine with an emissions control arrangement according to an embodiment of the present invention.

DETAILED DESCRIPTION

An engine 21 with an emissions control arrangement 23 according to an aspect of the present invention is shown in FIG. 1. The engine 21 includes an intake 25, such as an intake manifold, and an exhaust system 27.

An EGR system 29 is also provided and comprises a conduit 31 between the exhaust system 27 and the intake 25 and an EGR controller between the exhaust system and the conduit. The EGR controller can comprise any one or more of various suitable arrangements for controlling EGR flow, such as an EGR valve 33, a turbocharger 55, 57, such as a variable geometry turbocharger (VGT), an exhaust backpressure device such as a valve 100 upstream or downstream of a turbine 57 of a turbocharger, an intake throttle 58, a charge air recirculation system such as is disclosed in International Application PCT/US2006/001231, entitled ENGINE WITH EXHAUST TEMPERATURE CONTROL AND METHOD OF CONTROLLING ENGINE EXHAUST GAS TEMPERATURE AND ENGINE INTAKE TEMPERATURE (which is incorporated by reference, and the like, and, typically, by some combination of two or more of these controllers. For purposes of illustration, control of EGR flow using an EGR valve 33 between the exhaust system and the conduit will be described, it being understood that EGR flow can be controlled by various other suitable arrangements. The EGR valve 33 is adapted to control EGR flow from the exhaust system 27 to the intake 25 by opening and closing. The conduit 31 of the EGR system 29 will ordinarily connect upstream of an intake manifold of the intake 25 and downstream of a charge air cooler 102 (CAC), however, as shown in phantom, other embodiments can be provided wherein the conduit is connected upstream of that point, such as at a point upstream of a compressor 55.

The EGR system 29 also typically includes an EGR cooler 35 in the conduit 31. By adjusting the EGR flow to allow more EGR flow to the intake 25, combustion temperatures in the engine can be kept at temperatures to minimize formation of NOx. Prior to arrival at the intake 25, the EGR flow is typically cooled in the EGR cooler 35, which also facilitates maintaining lower combustion temperatures.

An exhaust aftertreatment (EAT) system including a reduction agent introduction system 37 is provided for introducing a reduction agent into the exhaust system 27 at a point 43 that is typically downstream of the turbine stage of the turbocharger 57. The reduction agent introduction system 37 typically includes a reservoir 39 for the reduction agent and a pump 41 for introducing the reduction agent into the exhaust system 27. Downstream of the introduction point 43 for the reduction agent, the EAT system typically includes a NOx abatement catalyst 45 such as Urea-SCR, HC-SCR (or SCR involving ammonia, hydrogen, alcohols, etc.), or LNA.

The reduction agent is any one of the various forms of reduction agent suitable for reducing NOx emissions, such as urea, ammonia, and the like. As the exhaust stream and reduction agent passes through the NOx abatement catalyst 45, the reduction agent reacts with the NOx in the exhaust stream to reduce the NOx to molecular nitrogen and water, thereby reducing the NOx emissions from the engine 21.

Typically, the efficiency of the EAT system improves as exhaust temperatures Texh increases to an optimum point. The optimal Texh is typically primarily a function of the particular catalyst being used. Causes for increases in Texh may include increased engine load or increased ambient temperature Tamb. Another possible cause for increased Texh is decreased ambient pressure Pamb, such as when the engine operates at higher altitudes.

The engine 21 also includes a controller 47 arranged to adjust EGR flow and reduction agent introduction as functions of each other. Ordinarily, of course, EGR flow and reduction agent introduction will be adjusted as functions of numerous other factors, as well. The controller 47 will ordinarily be arranged to adjust EGR flow and reduction agent introduction appropriately to prevent NOx emissions from exceeding a predetermined maximum value, such as the values set in the US07, US10, and Euro 5 regulations. It is expected that additional measures such as diesel particulate filters (DPF) will be necessary to fully comply with the anticipated regulations. At the same time, the controller 47 can be arranged to appropriately adjust EGR flow and reduction agent introduction so that EGR flow is kept at a relatively low rate, such as the lowest rate that, together with whatever EAT systems are provided, such as the reduction agent introduction system 37 and NOx abatement catalyst 45, will provide emissions having NOx levels no higher than the maximum allowable level.

One or more sensors can be arranged to sense at least one operational parameter and to send a signal corresponding to the at least one sensed operational parameter to the controller 47. The controller 47 can be arranged to adjust EGR flow and reduction agent introduction as a function of the at least one sensed operational parameter. Typically, various operational parameters will be monitored by a plurality of sensors. For example, sensors 49, 51, and 53 can monitor operational parameters including Tamb, Pamb, and Texh, respectively. If, for example, an increase in Texh would increase EAT efficiency, the controller 47 might reduce or shut off EGR flow by adjusting the EGR valve 33 (or any other EGR controller) and, at the same time, might adjust reduction agent introduction upwardly so that the combined effect of EGR and EAT continues to produce emissions with NOx at permissible levels, but with reduced EGR flow relative to the higher Texh.

Similarly, Texh will ordinarily be expected to generally correspond to Tamb and Pamb so that when one or both of Tamb and Pamb are at particular levels, a change in Tamb or Pamb might be expected to result in a corresponding change in Texh. For example, a rise in Tamb or a decrease in Pamb may be expected to result in a rise in Texh. Thus, the controller 47 might be arranged to adjust EGR flow and reduction agent introduction as a function of Tamb and/or Pamb, instead of or in addition to adjusting EGR flow and reduction agent introduction as a function of Texh.

A compressor 55 is ordinarily arranged to introduce compressed charge air to the intake 25. The compressor 55 may be a component of a turbocharger, such as a variable geometry turbocharger. The controller 47 can be arranged to adjust charge air introduction by the compressor 55 as a function of EGR flow and other engine operating parameters. For example, if the compressor 55 delivers charge air at a particular pressure Pc1, the pressure of the EGR flow must be sufficiently high that it will be able to mix with the pressurized charge air. Usually, this is accomplished by restricting the exhaust flow through a variable geometry turbine 57 or by other means to restrict exhaust flow, such as by recirculating charge air as disclosed in International Patent Application No. PCT/US2006/001231, which is incorporated by reference.

If it is desired to reduce EGR flow, ways by which EGR flow can be reduced include closing the EGR valve and reducing exhaust back pressure. If EGR flow is reduced, charge air can be delivered at a pressure Pc2 lower than Pc1 and pressure differential across the engine can be minimized. However, if EGR flow is reduced, cooling demands are reduced and cooling equipment size may be minimized. Reducing pressure of charge air from the compressor 55 is made possible by reducing EGR, since less pressure is required to force the lower total mass flow into the combustion chamber. If exhaust temperatures are such that EAT can keep NOx emissions from exceeding a predetermined maximum value, EGR flow can be reduced, as can pressure of charge air from the compressor 55.

The engine 21 includes a number of fuel injectors 59 arranged to inject fuel into the engine cylinders 61. Timing of fuel injection for maximum power generation will often result in higher NOx emissions than might be obtained if fuel injection occurs at some other time, such as by delaying fuel injection. The controller 47 can be arranged to adjust timing of fuel injection as a function of one or more of throttle demand, Texh, Tamb, Pamb, EGR flow, reduction agent introduction, and charge air introduction to prevent NOx emissions from exceeding a predetermined maximum value.

The controller 47 can adjust a variety of functions such as EGR flow, reduction agent introduction, charge air introduction, and fuel injection as functions of one another, and may further adjust those functions as functions of operational parameters such as Texh, Tamb, and Pamb. The adjustment can be different depending upon desired result. For example, it may, in some circumstances, be desirable to adjust the various functions in view of one another and the operational parameters to maintain NOx emissions within a desired level, as well as to optimize fuel consumption, such as by timing fuel injection so that, within the NOx limits, maximum power can be generated. Alternatively, the goal may be, for example, to maintain NOx emissions within a desired level and minimize the engine cooling requirements, such as by minimizing EGR flow. Ordinarily delayed injection timing for NOx control also increases heat rejection, i.e., energy not used in power generation will usually generate heat, which, in turn increases requirements for cooling.

In a method according to an aspect of the present invention, EGR flow from the exhaust system 27 to the intake 25 of the engine 21 is adjusted. Introduction of a reduction agent by a reduction agent introduction system 37 into the exhaust system, typically downstream of the turbine 57 is also adjusted. The EGR flow and reduction agent introduction can be adjusted as functions of each other. In addition, one or more of EGR flow, reduction agent introduction, charge air introduction by the charge air compressor 55, and timing of fuel injection by the fuel injector 59 can all be adjusted as functions of any other one or more of the functions. Further, one or more of those functions may be adjusted as a function of the at least one sensed operational parameter, such as Texh, Tamb, and Pamb. It will be appreciated that the amount that one function is adjusted as a function of another function(s) or operational parameter(s) will depend upon the results sought to be achieved and characteristics of the particular equipment involved. For example, ordinarily it will be appropriate to decrease EGR flow as a function of increasing ambient temperature Tamb, increasing exhaust temperature Texh, or decreasing ambient pressure Pamb, however, desired operation of other functions, other operational parameters, or objectives other than limiting NOx may require an increase in EGR flow upon increasing Tamb or Texh or decreasing Pamb. Likewise, ordinarily a reduction in EGR flow, which would ordinarily be expected to result in increased NOx in the emissions, would be offset by introduction of more reduction agent, however, this need not necessarily be the case.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. An engine with an emissions control arrangement, comprising:
   an engine comprising an intake and an exhaust system;
   an EGR system comprising a conduit between the exhaust system and the intake and an EGR controller adapted to control EGR flow from the exhaust system to the intake;
   a reduction agent introduction system adapted to introduce a reduction agent into the exhaust system;
   a controller programmed to adjust the EGR flow in a non-zero amount while also simultaneously adjusting the reduction agent introduction in a non-zero a as a function of the EGR flow to prevent NOx emissions from exceeding a predetermined maximum value while the engine is operating; and
   a compressor arranged to introduce compressed charge air to the intake, wherein the controller is arranged to adjust charge air introduction as a function of the EGR flow and the reduction agent introduction.

2. The engine with an emissions control arrangement as set forth in claim 1, comprising a sensor arranged to sense at least one operational parameter and to send a signal corresponding to the at least one sensed operational parameter to the controller, the controller being arranged to adjust the EGR flow and the reduction agent introduction as a function of the at least one sensed operational parameter.

3. The engine with an emissions control arrangement as set forth in claim 2, wherein the at least one operational parameter comprises at least one of ambient temperature, ambient pressure, and exhaust temperature.

4. The engine with an emissions control arrangement as set forth in claim 1, wherein the controller is arranged to adjust the charge air introduction, the EGR flow, and the reduction agent introduction to prevent NOx emissions from exceeding a predetermined maximum value.

5. The engine with an emissions control arrangement as set forth in claim 1, wherein the compressor is a component of a turbocharger.

6. The engine with an emissions control arrangement as set forth in claim 5, wherein the compressor is part of a variable geometry turbocharger.

7. The engine with an emissions control arrangement as set forth in claim 1, comprising a fuel injector arranged to inject fuel into the engine, the controller being arranged to adjust timing of fuel injection as a function of the EGR flow and the reduction agent introduction.

8. The engine with an emissions control arrangement as set forth in claim 7, wherein the controller is arranged to adjust the fuel injection timing, the EGR, flow, and the reduction agent introduction to prevent NOx emissions from exceeding a predetermined maximum value.

9. A method of controlling engine emissions, comprising:
   adjusting EGR. flow from an exhaust system to an intake of an engine;
   adjusting introduction of a reduction agent into the exhaust system, the EGR flow being adjusted in a non-zero amount while also simultaneously adjusting reduction agent introduction non-zero amount as a function of the EGR flow so that NOx emissions are prevented from exceeding a predetermined maximum value while the engine is operating; and
   adjusting charge air introduction as a function of the EGR flow and the reduction agent introduction.

10. The method of controlling engine emissions as set forth in claim 9, comprising adjusting timing of fuel injection as a function of the EGR flow, the reduction agent introduction, and the charge air introduction.

11. The method of controlling engine emissions as sot forth in claim 10, comprising sensing at least one operational parameter and adjusting the EGR flow, the reduction agent introduction, the charge air introduction, and the fuel injection timing as a function of the at least e sensed operational parameter.

12. The method of controlling engine emissions as set forth in claim 9, comprising sensing at least one operational parameter and adjusting the EGR flow, the reduction agent introduction, and the charge air introduction as a function of the at least one sensed operational parameter.

13. The method of controlling engine emissions as set forth in claim 9, comprising adjusting timing of fuel injection as a function of the EGR flow and the reduction agent introduction.

14. The method of controlling engine emissions as set forth in claim 9, comprising sensing at least one operational parameter and adjusting the EGR flow and the reduction agent introduction as a function of the at least one sensed operational parameter.

15. The method of controlling engine emissions as set forth in claim 9, comprising decreasing the EGR flow as a function of increasing ambient temperature.

16. The method of controlling engine emissions as set forth in claim 9, comprising decreasing the EGR flow as a function of increasing exhaust temperature.

17. The method of controlling engine emissions as set forth in claim 9, comprising decreasing the EGR flow as a function of decreasing ambient pressure.

18. The method of controlling engine emissions as set forth in claim 9, wherein the EGR flow and the reduction agent introduction are inversely related.

19. The engine with an emissions control arrangement as set forth in claim 1, comprising a selective catalytic reduction catalyst downstream of the reduction agent introduction system.

20. The engine with an emissions control arrangement as set forth in claim 16, comprising a source of urea or an ammonia-based substance, the reduction agent introduction system being connected to the source of urea or the ammonia-based substance for introducing urea or the ammonia-based substance into the exhaust system.

21. The engine with an emissions control arrangement as set forth in claim 1, comprising a source of urea or an ammonia-based substance, the reduction agent introduction system being connected to the source of urea or the ammonia-based substance for introducing urea or the ammonia-based substance into the exhaust system.

22. The method of controlling engine emissions as set forth in claim 9, wherein the reduction agent is introduced into the exhaust system upstream from a selective catalytic reduction catalyst.

23. The method of controlling engine emissions as set forth in claim 22, comprising introducing urea or an ammonia-based substance into the exhaust system as the reduction agent.

24. The method of controlling engine emissions as set forth in claim 9, comprising introducing urea or an ammonia-based substance into the exhaust system as the reduction agent.

* * * * *